United States Patent
Wu et al.

(10) Patent No.: US 8,848,221 B2
(45) Date of Patent: Sep. 30, 2014

(54) METHOD AND SYSTEM FOR MANAGING PRINT ON DEMAND JOBS WITH REMOTE CACHE

(75) Inventors: Philip Wu, Seal Beach, CA (US); Daniel Barber, Tustin, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 212 days.

(21) Appl. No.: 13/249,071

(22) Filed: Sep. 29, 2011

(65) Prior Publication Data

US 2013/0083349 A1 Apr. 4, 2013

(51) Int. Cl.
*G06F 15/00* (2006.01)
*G06F 3/12* (2006.01)

(52) U.S. Cl.
CPC ............ *G06F 3/1212* (2013.01); *G06F 3/1247* (2013.01); *G06F 3/1267* (2013.01); *G06F 3/1288* (2013.01)
USPC .............................. 358/1.15; 709/227; 726/24

(58) Field of Classification Search
None
See application file for complete search history.

(56) References Cited

U.S. PATENT DOCUMENTS

| | | | |
|---|---|---|---|
| 7,069,327 B1 * | 6/2006 | Fabre | 709/227 |
| 2003/0035138 A1 * | 2/2003 | Schilling | 358/1.15 |
| 2010/0322520 A1 * | 12/2010 | Yoshida | 382/195 |
| 2011/0228340 A1 * | 9/2011 | Farrell et al. | 358/1.18 |
| 2011/0258702 A1 * | 10/2011 | Olney et al. | 726/24 |

* cited by examiner

*Primary Examiner* — Mark Zimmerman
*Assistant Examiner* — Helen Q Zong
(74) *Attorney, Agent, or Firm* — Chen Yoshimura LLP

(57) ABSTRACT

A method and system for managing print job through a process carried out by an online web-store server. The process includes the steps of receiving a print job order by a web-store server, and checking a remote cache via a network to determine whether a PDF file is stored therein. If the matching PDF file does not exist, then the server generates a new PDF file containing the sequence of articles and transmits the new PDF file to the print server, and saves the new PDF file in the remote cache. If the matching PDF exists, then the stored PDF is retrieved from the remote cache, and the print server uses the retrieved PDF file to print the print job without the web-store server creating the new PDF file or transmitting the new PDF file to the print server.

18 Claims, 5 Drawing Sheets

METHOD AND SYSTEM FOR MANAGING PRINT ON DEMAND JOBS WITH REMOTE CACHE

BACKGROUND OF THE INVENTION

1. Field of the Invention

This invention relates generally to method and system for printing job management and in particular, it relates to method and system for managing print on-demand (POD) printing jobs with a remote cache.

2. Description of Related Art

Increasingly POD jobs are submitted to and handled by network or web-based systems. For example, a customer may place a POD job order to a web-store server to print a booklet that is a compilation of several articles. The customer may supply some or all of the articles, or more likely the web-store server will gather some or all of these articles from its own database and/or from one or more third parties' content sources, or combine its gathering with the customer's submissions. The web-store server combines the articles into a single portable document format (PDF) (or other format types like html, text doc, XPS, ePub, etc.) file, and creates a job definition format (JDF) file. The web-store server then sends the PDF and JDF files via a network such as the Internet to a remote print server for printing the booklet for the customer.

Often times a multiplicity of customers may need similar, but not necessarily identical, booklets. For example, a booklet B in its complete compilation includes three articles A1, A2 and A3. Most customers C will order booklet B that contains all of these three articles, and the web-store server will create PDF and JDF files for booklet B containing all of the three articles, and send them to the remote print server for printing the POD orders of customers C. However, a customer C1 may have article A3 already and will order a customarily modified booklet B1 that contains only articles A1 and A2. For this POD order by customer C1, the web-store server will create different PDF and JDF files for booklet B1 that contains only articles A1 and A2, and send them to the remote print server for printing the POD order of customer C1. Likewise another customer C2 may have article A1 already and will order another customarily modified booklet B2 that contains only articles A2 and A3. For this order by customer C2, the web-store server will also create different PDF and JDF files for booklet B2 that contains only articles A2 and A3, and send them to the remote print server for printing the POD order by customer C2.

Typically, each time new PDF and JDF files are created for a new POD order, they are transmitted to the remote printer via the network. For example, when a subsequent customer C3, who also already has article A3, places a new POD order for printing a booklet B1 that contains only articles A1 and A2, the web-store server will again create PDF and JDF files for booklet B1 that contains only articles A1 and A2, and send them to the remote print server for printing the POD order of customer C3.

The size of the PDF file in a POD order can be quite large, which increases the burden on the web-store server to generate the PDF file, as well as the burden on the network to transmit the PDF file. There is a need to reduce the occurrences of generating and transmitting repetitive large PDF files, in order to increase the efficiency, and reduce the use of the resources, of both the web-store server and the network.

SUMMARY

The present invention is directed to a method and system for managing POD jobs to be processed by a web-server and printed by a print server with a remote cache.

An object of the present invention is to provide a remote cache to a print server to save PDF files that have been created by a web-store server and submitted to the printer server for previous POD orders, so that repetitive or duplicative PDF files for subsequent POD orders need not to be created again by the web-store server or transmitted again to the print server.

To achieve these and/or other objects, as embodied and broadly described, the present invention provides a method and system for managing print job through a process carried out by an online web-store server. The process includes the steps of receiving a print job order by a web-store server for printing a sequence of articles, and checking a remote cache via a network to determine whether a PDF file is stored therein which contains the sequence of articles matching the print job order. If the matching PDF file does not exist, then the web-store server generates a new PDF file containing the sequence of articles and transmits the new PDF file to the print server via the network for printing the sequence of articles, and saves the new PDF file in the remote cache. If the matching PDF exists, then the stored PDF is retrieved from the remote cache, and the print server uses the retrieved PDF file to print the print job without the web-store server creating the new PDF file or transmitting the new PDF file to the print server.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method and system for promoting and marketing environmental friendly print shops. The present invention method may be implemented by a computer software program that has program codes and instructions for implementing the steps of the present invention.

Figure 1:
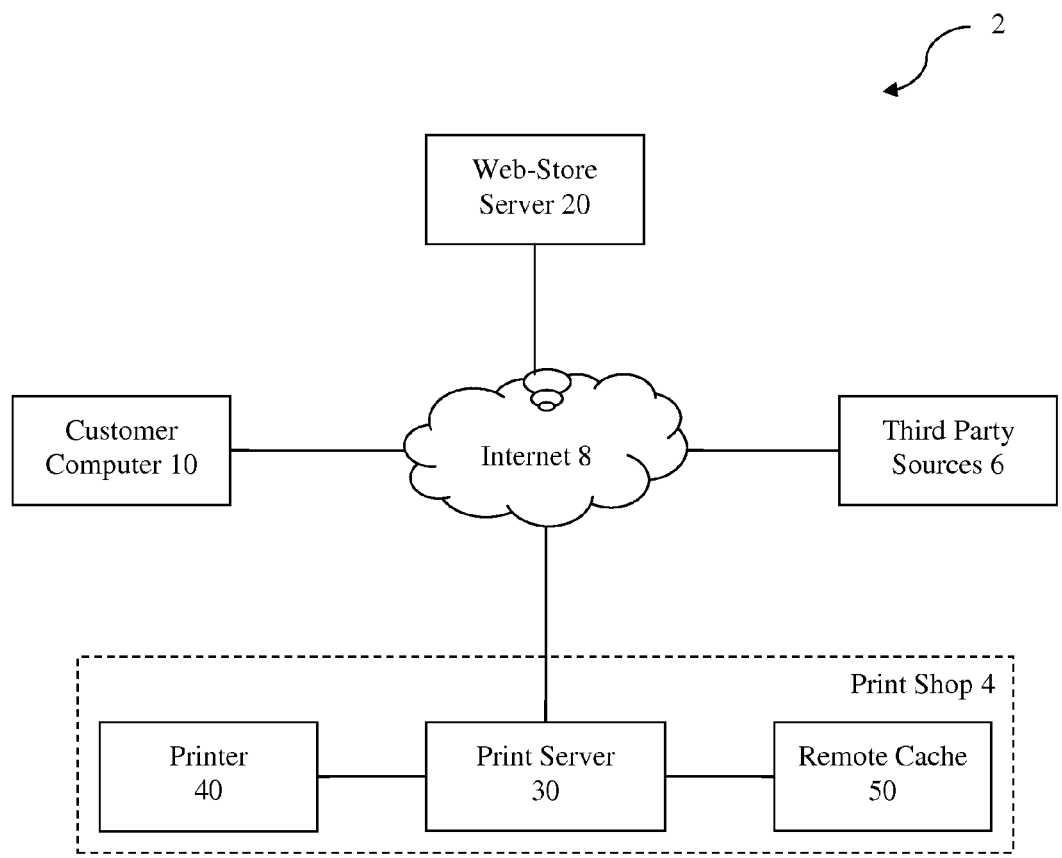
FIG. 1 is a schematic block diagram illustrating an exemplary online print shop arrangement for customers to order POD jobs from a web-store server.

Referring to FIG. 1, there is shown at 2 a schematic block diagram illustrating an exemplary online arrangement for handling POD jobs. The online arrangement 10 generally includes customer computers 10 (only one is shown for clarity), a web-store server 20, a print server 30 which is part of a print shop 4 and connected to print shop printers 40 (only one is shown for clarity) and a remote cache 50, and third party content sources 6 (only one is shown for clarity) all connected wired or wirelessly to an open network such as the Internet 8.

In this application the term "web-store" generally refers to an online platform where customers may access via the Internet 8. The online platform typically provides web-pages upon which customers may utilize to make online orders. The web-pages are generated typically by computer software programs installed on and executed by one or more web-store servers 20. The computer programs installed and executed on the web-store server 20 also cause the print server 30 to process the online orders made by the customers.

In this application the term "print shop" generally refers to an environment of professional print shops, publishing workshops, print/copy departments of large organizations or business entities, and press unit of educational institutions such as colleges and universities, where a variety of POD orders can be processed by one or more print servers and printed by utilizing one or more printers.

Figure 2:
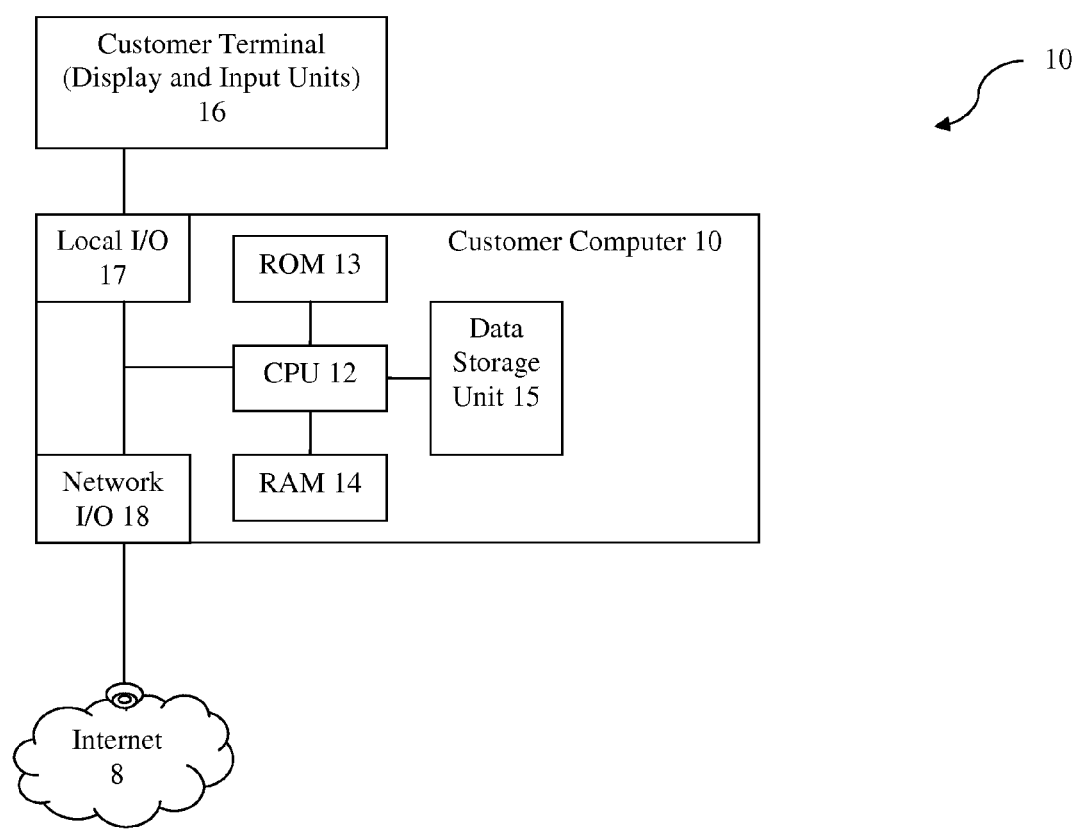
FIG. 2 is a schematic block diagram illustrating an exemplary customer computer system for placing POD orders with the web-store server according to an embodiment of the present invention.

Referring to FIG. 2, there is shown a schematic block diagram illustrating an exemplary customer computer system 10, whereupon various embodiments of the present invention may be implemented. The customer computer 10 generally includes a central processor unit (CPU) 12 that controls the function and operation of the computer 10 and execute computer instructions and programs that may be installed or saved on a read only memory (ROM) 13, a random access memory (RAM) 14, or a data storage unit 15 (such as a hard disc drive or a flash memory) coupled to the CPU 12. One or more user terminals 16 (each may have its display and input units) may be connected to the computer 10 to enable a customer and/or user to interact with the computer 10. Alternatively the computer 10 may have its own integrated display and input units to enable a customer or user to interact with the computer 10. The computer 10 typically also has a local input/output (I/O) port 17 for connection with the user terminal 16, and a network I/O port 18 for connection to a network such as the Internet 8 so the computer 10 may remotely communicate with the web-store server 20 and print shop servers 30. It is understood that customer computer 10 may be any suitable computer, such as a desktop computer, a laptop computer, a server, a netbook computer, a tablet computer, or any suitable data processing apparatus including but not limited to smartphones and other handheld devices that have suitable data processing capabilities.

Figure 3:
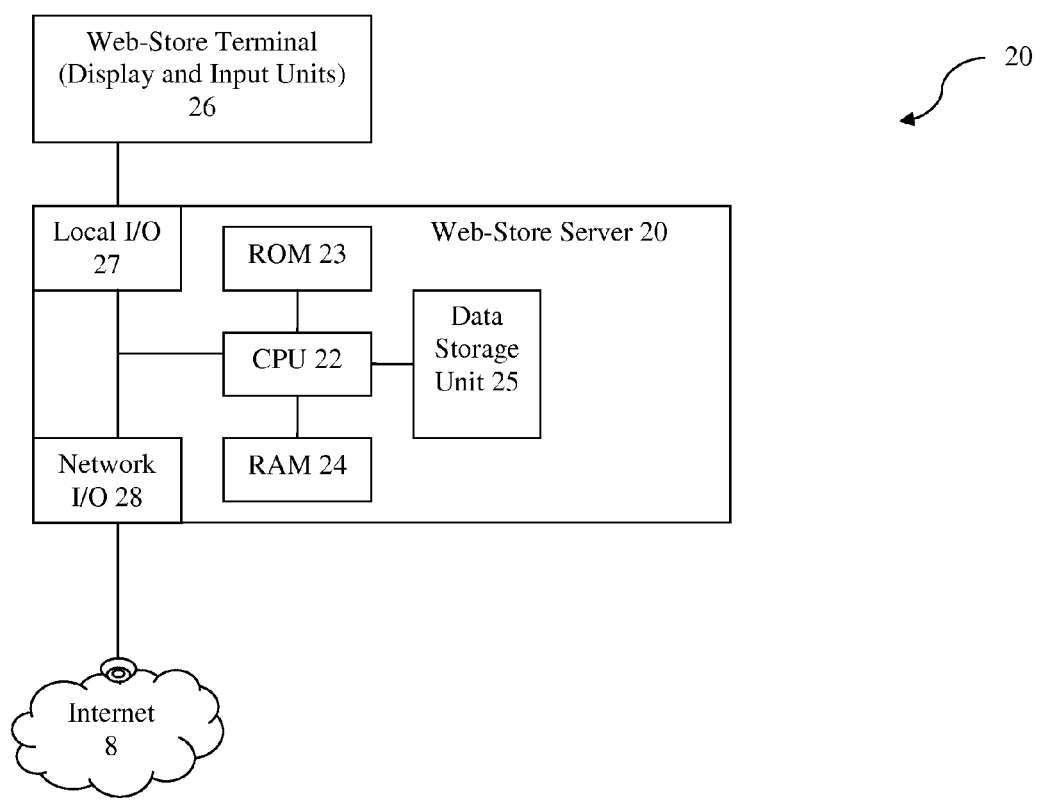
FIG. 3 is a schematic block diagram illustrating an exemplary web-store server for processing POD orders.

Referring to FIG. 3, there is shown a schematic block diagram illustrating an exemplary web-store server 20, whereupon various embodiments of the present invention may be implemented. The web-store server 20 generally includes a central processor unit (CPU) 22 that controls the function and operation of the server 20 and execute computer instructions and programs that may be installed or saved on a read only memory (ROM) 23, a random access memory (RAM) 24, or a data storage unit 25 (such as a hard disc drive or a flash memory) coupled to the CPU 22. One or more user terminals 26 (each may have its display and input units) may be connected to the server 20 to enable an operator and/or user to interact with the server 20. Alternatively the server 20 may have its own integrated display and input units to enable an operator or user to interact with the server 20. The server 20 typically also has a local input/output (I/O) port 27 for connection with the user terminal 26, and a network I/O port 28 for connection to a network such as the Internet 8 so the server 20 may remotely communicate with the customer computer 10 and print shop servers 30. It is understood that web-store server 20 may be any suitable computer or computer system or other electronic devices that have suitable data processing capabilities.

Figure 4:
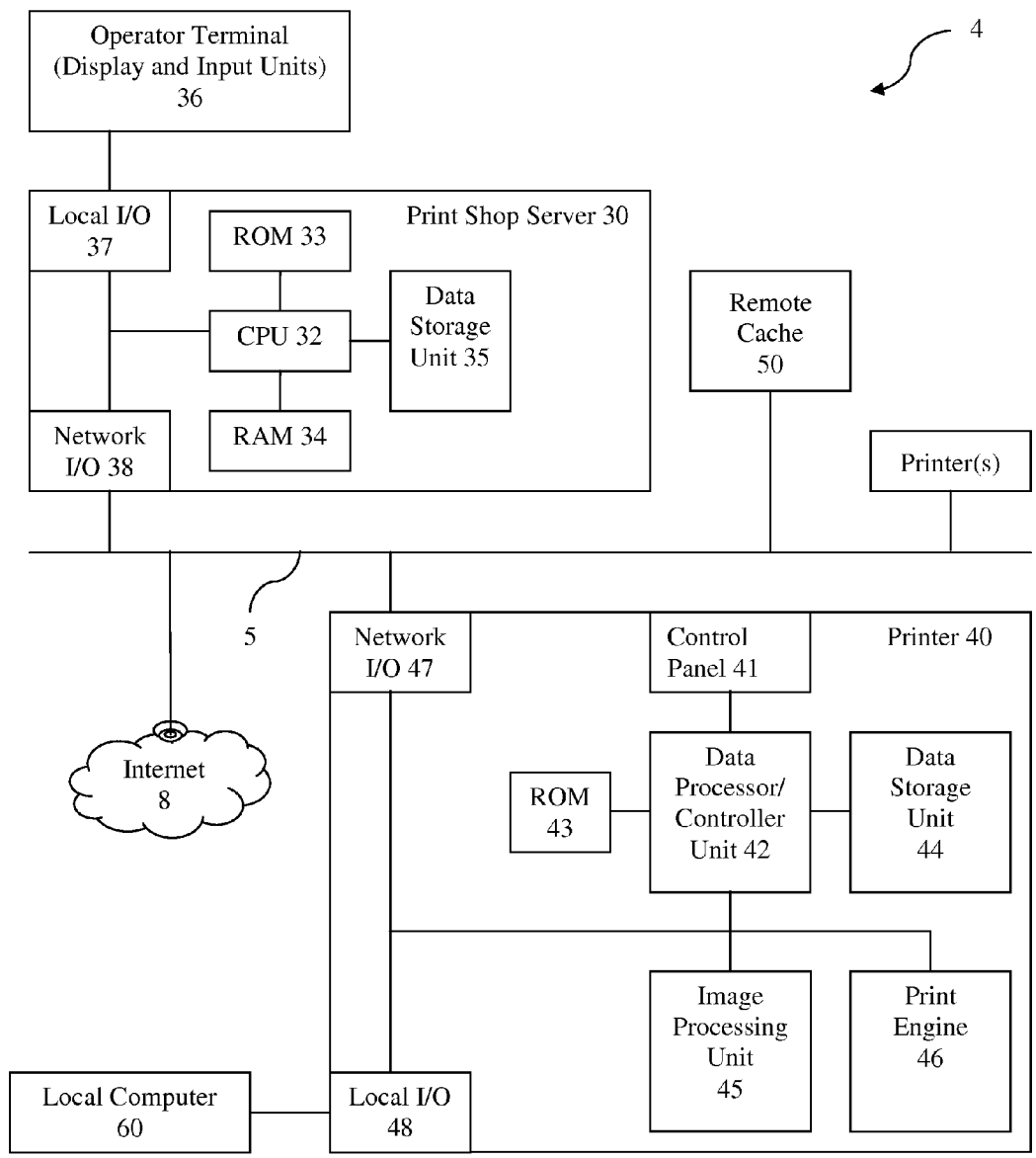
FIG. 4 is a schematic block diagram illustrating an exemplary print shop arrangement having a print server with a remote cache and connected to printers for printing POD orders.

Referring to FIG. 4, there is shown a schematic block diagram illustrating an exemplary print shop arrangement 4 having a print server 30 connected to printers 40 and utilizing a remote cache 50 for implementing the embodiments of the present invention.

In the exemplary print shop printing system set up or arrangement 4, a multiplicity of color and/or black and white printers are connected to and controlled by the printer shop server 30 through a data communication channel or equipment 5 which may be a wired or wireless network, a serial bus or a dedicated cable. One or more of the printers, such as printer 40, may also be directly connected to and controlled by a local computer 60. Other devices (not shown) may also be connected to the server 30, the local computer 60 or network channel 5, such as scanners, finishing devices, etc., as part of the printing system set up or arrangement 4. The print shop system 4 may also include a number of "off-line" (or "off-network") devices (not shown) that are not connected to the network channel 5, which devices may be any type of devices used in the print shop, such as finishing devices, prepress devices, etc.

In this application the term "printer" may refer to small desk-top printers typically seen in an office environment, or large digital printing systems used in print/copy departments at large organizations or professional print shops. The term may also cover other similar image and document processing devices such as copiers or multifunction ("all-in-one") printers that also have copier, scanner and/or facsimile functions. The printer may be directly attached to a computer or server locally, or connected to a computer or server through a network remotely, where the computer or server are used to manage a print job to be processed by the printer. The printer may have multiple paper trays to store paper of various sizes, color, and types. Further, the printer may be equipped with a sophisticated output sorting mechanism with multiple output trays to perform collate printing or other print finishing functions.

As shown in FIG. 4, the print shop server 30 generally includes a central processor unit (CPU) 32 that controls the function and operation of the server 30 and execute computer instructions and software programs that may be installed or saved on a read only memory (ROM) 33, a random access memory (RAM) 34, or a data storage unit 35 (such as a hard disc drive) coupled to the CPU 32. One or more print shop operator terminals 36 (each may have its display and input units) may be connected to the server 30 to enable print shop operators and/or users to interact with the server 30 and/or the rest of the print shop system 4. Alternatively the server 30 may have its own integrated display and input units to enable print shop operators and/or users to interact with the server 30 and/or the rest of the print shop system 4. The server 30 typically has a local input/output (I/O) port 37 for connection with the user terminal 36, and a network I/O port 38 for connection to the data communication channel 5. Through the network channel 5 the server 30 is also connected to the external computer network such as the Internet 8 so the server 30 can remotely communicate with the customer computers 10 and web-store server 20.

As also shown in FIG. 3, the printer 40 typically has a control panel 41, a controller or control unit 42 which controls the other internal units of printer 40 and is connected to the control panel 41, read-only memory (ROM) 43 and a data storage unit 44. The control panel 41 is accessible by a user and may include a display screen such as a liquid crystal display (LCD) display screen and user input means such as keys, buttons, touch screen, etc., for a user to communicate with and control the function and operation of printer 40. The printer 40 also has an image processing unit 45 and a print engine 46. The printer 40 typically has a network input/output (I/O) port 47 for connection with the print shop server 30, and a local I/O port 48 for optionally connecting to the local computer 60.

It is understood that while FIG. 4 shows a print shop environment, the present invention is not limited to any physical setting of a print shop or network, and can be applied to a printing system having a distributed setting where printers at different locations are connected to one print shop server. In particular, it should be apparent that one or more of the components of the printing system can communicate with the rest of the system via virtual private network (VPN) or similar means through the Internet 8.

As further shown in FIG. 3, the present invention provides a remote cache 50. Remote cache 50 may be a data storage device coupled to the print server 30. Alternatively Remote cache 50 may be a part or portion of the data storage unit 35 of the print server 30.

The computer software program that implements the present invention method and process may be installed on the web-store server 20, and its application modules or client-end component parts may be installed on the customer computers 10 and/or printer shop servers 30 (or on the printer 40 or local computer 60, and the remote cache 50). When a web-store operator executes the exemplary software program of the present invention, the web-store server 20 carries out various respective functions of the software to perform the web-store server part of the exemplary process of the present invention. In addition, when a customer executes an application module of the exemplified software program of the present invention from the customer's end, the customer computer 10 carries out various respective functions of the software to perform the customer part of the exemplary process of the present invention. Furthermore, when a print shop operator executes an application module of the exemplified software program of the present invention from the print shop's end, the printer shop server 30 carries out various respective functions of the software to perform the print shop part of the exemplary process of the present invention. Together the execution of the various application modules of the exemplary software program of the present invention by the web-store server 20, customer computers 10 and/or printer shop servers 30 cause the performance and completion of the exemplary method and process of the present invention described below.

As discussed earlier, many times a plurality of customers may need similar but not necessarily identical booklets. For example, the web-store may offer a "standard" booklet B which contains a sequence of three articles A1, A2 and A3. Customers C may order this complete compilation. However a customer C1 may order a customarily modified booklet B1 by removing article A3 from the sequence, and customer C2 may order another customarily modified booklet B2 by removing article A1 from the sequence. Each time an order is submitted, the web-store server 20 will need to create a PDF file and a JDF file for the ordered booklet, and send them to the remote print server 30 for printing the POD order. This process necessarily uses valuable resources of the web-store server 20 and the network 8.

The present invention is made to reduce the occurrences of generating and transmitting repetitive large PDF files, in order to increase the efficiency, and reduce the use of the resources, of both the web-store server and the network. It is observed that often times a subsequent POD order of a booklet has the same requirement of a previously submitted and processed order. For example, after a previously POD order from customer C1 for a modified booklet B1 has been processed by the web-store server 20 (i.e., a PDF file containing only articles A1 and A2, and a corresponding JDF file, have been created and sent to the printer server 30), the web-store server 20 may receive a new POD order from customer C3 who also wants to print a modified booklet B1. In a conventional process another PDF file also containing only articles A1 and A2, and a corresponding JDF file, must be created by the web-store server 20 and sent to the print server 30. However this PDF file is duplicative to the one earlier created for customer C1's order. If the earlier PDF file for customer C1's order has somehow been saved at the print server 30, then it can be retrieved and used for customer C3's order and there will be no need to create the new PDF file for customer C3's order.

Accordingly, the present invention provide the remote cache 50 to the print server 30 to save all distinctive PDF files from the print jobs, that have been created by the web-store server 20 and submitted to the printer server 30 for previous POD orders. When a new POD order is received by the web-store server 20, instead of immediately creating a new PDF file for the new order, the web-store server 20 will check to see whether a previously created and saved PDF file matches the requirement of the new order. If so, no new repetitive or duplicative PDF file needs to be created again by the web-store server 20 and transmitted again to the printer server 30, thereby reduces the burden on the web-store server 20 (for generating the PDF file), as well as the burden on the network (for transmitting the PDF file).

Figure 5:
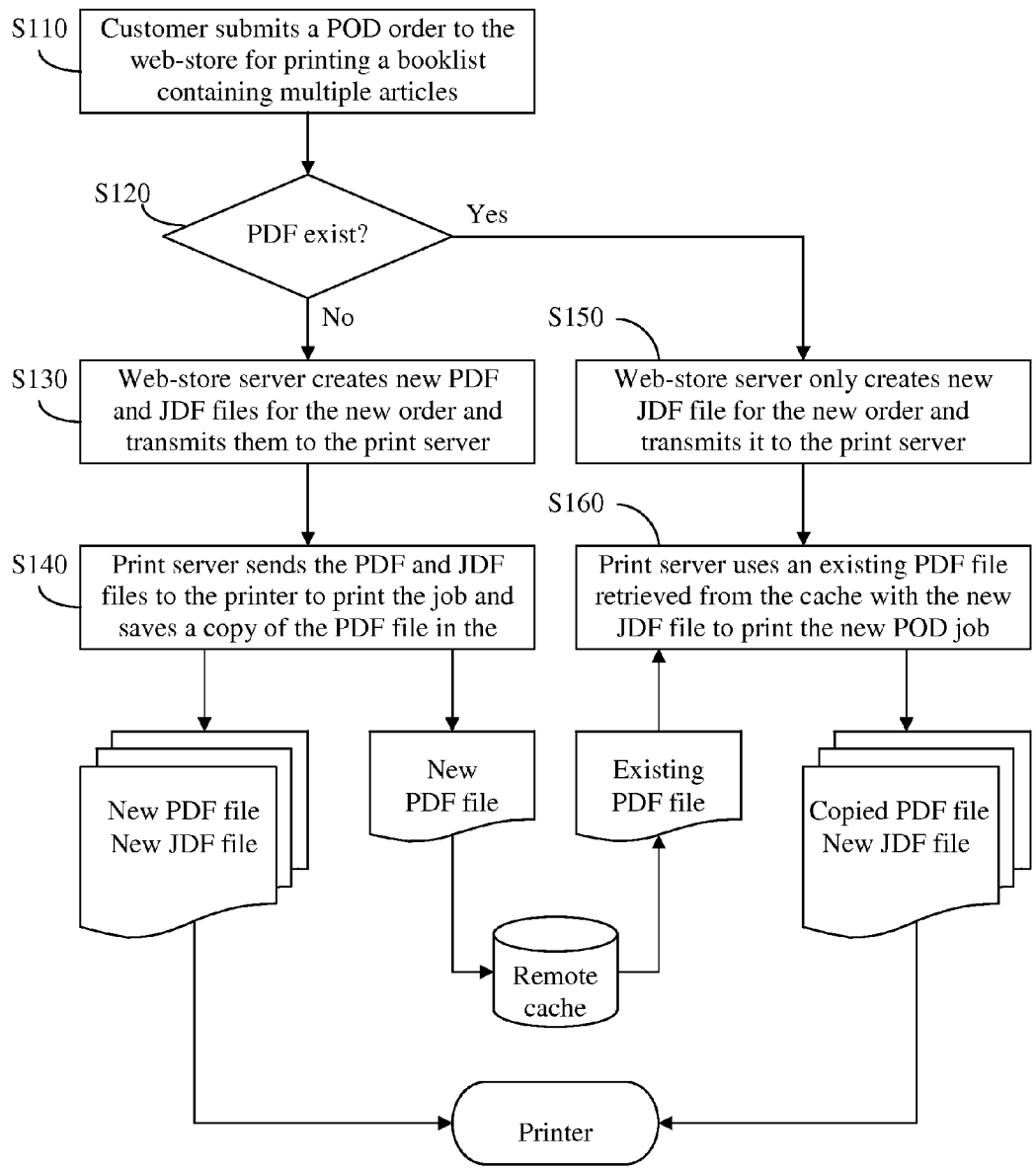
FIG. 5 is a flow chart showing an exemplary process implementing a method for managing POD jobs to be processed by a web-server and printed by a print server with a remote cache.

Referring to FIG. 5, there is illustrated an exemplary method and process of the present invention. At the beginning step S110, a customer submits a POD order to the web-store server 20 to requests a printing of a booklist that contains a combination or sequence of multiple articles. At step S120, the web-store server 20 checks the remote cache 50 of the print server 30 to determine if there is an existing PDF file (previously created for a previous order) stored in the cache 50 that has the same combination or sequence of the articles as the current order. If the answer is "NO" from step S120, then in step S130 the web-store server will create a new PDF file containing the articles in the combination or sequence requested in the customer's new POD order. The articles to be included may be supplied by the customer, or gathered by the web-store server 20 from its own data storage unit or a third party's online content source 6. The web-store server 20 will also generate a new JDF file for the POD job, and then transfers the new PDF and JDF files to the print server 30. At step S140 the print server 30 sends the new PDF and JDF files to the printer 40 for printing the POD order, and also stores the new PDF in the remote cache 50, which will be used later to perform the check in step S 120.

If the answer is "YES" from step S 120, then in step S150 the web-store server will only create a new JDF file for customer's new order and send it to the print server 30, but not the PDF file. There is no need for the web-store server 20 to gather or collect the articles for creating a PDF file because the existing PDF file previously stored in the cache 50 already contains all these articles. Instead, in step S160 the web-store server or print server will retrieve from the remote cache 50 an existing PDF file that contains the combination or sequence matching the customer's new order, and copy and use the existing PDF file. The copied PDF file and the new JDF file now constitutes the new print job sent by the print server 30 to the printer 40 to print the customer's order. Since there is no need for the web-store server 20 to recreate a new PDF file and transmit to the print server 30, the efficiency of the process is improved and the use of network resources is reduced, which make the entire process much faster.

It is noted that because in step S120 a checking of whether a matching PDF exists in the cache 50, and in step S140 a new PDF file is always saved in the cache 50, all unique and distinctive combinations or sub-combinations of any sequence of the articles are stored in the cache 50. In addition, these PDF files are stored in the already processed, ready to print PDF form so there is no need to recreate them when a new matching order is received subsequently.

There are a number of approaches that may be utilized in step S120 to determine if an existing PDF for a particular combination or sub-combination or sequence of articles. One approach is to use the name of the PDF file to identify the combination or sub-combination of the articles. For example, a PDF file containing a combination of articles A1, A2 and A3 may be "a1a2a3.pdf", while a PDF file containing a sub-combination of articles A2 and A3 may be "a2a3.pdf". If the names of the articles are too long or the number of articles is too many to make the PDF file name too cumbersome, a hash-value approach may be utilized.

Under this approach, a hash value of the list of all of the articles contained in a PDF file is calculated. Each article can be identified by its title and/or author or a unique ID like "A1", etc., and the list of all of the articles in the PDF file will be a long character string. A hash function may be used to calculate this long character string. For example, using a hash function known as "MD5", the hash result of a long character string is a 16-character string. The MD5 hash result is almost guaranteed to be unique. The hash result (i.e., the 16-character string) is used as the PDF filename. Therefore, the names of the PDF files can still be used for the comparison of step (S120), but these filenames will not be too long (they will always be 16 characters if, for example, the hash result is calculated by the MD5 hash function).

It is noted that while PDF and JDF files are described in the exemplary embodiments of the present invention, other printable files of other document exchange and/or job description formats may also be used. For example the open XML Paper Specification (XPS or OpenXPS) file may be used for processing and transmitting the articles to be printed.

The above described exemplary method and process according to the present invention has many advantages. It eliminates the re-creation and re-transmission of duplicative PDF files. It increases the efficiency of the web-store server 20 as there is no need to generate repetitive PDF files if a previously created PDF exists that matches a new POD order. It reduces the burden on network resources as there is no need to transmit large duplicative PDF files from the web-store server 20 to the print server 30 through the network. It provides a remote cache 50 to the print server 30 for storing PDF files that have been created by a web-store server 20 and submitted to the printer server 30 for previous POD orders, so that when a subsequent POD order is received, the web-store server 20 can check to see whether a matching PDF order already exists, and if so there is no need to create a new PDF file by the web-store server 20 or transmitted it to the print server 30.

It will be apparent to those skilled in the art that various modification and variations can be made to the methods of the present invention without departing from the spirit or scope of the invention. Thus, it is intended that the present invention cover modifications and variations that come within the scope of the appended claims and their equivalents.

What is claimed is:

1. A method for managing print jobs, comprising the steps of:
   a. a web-store server receiving a print job order for printing a sequence of more than one articles;
   b. the web-store server checking a remote cache via a network to determine whether a single printable file is stored therein which contains the sequence of articles matching the print job order;
   c. if the matching single printable file does not exist, then:
      c1. the web-store server generating a new single printable file containing the sequence of articles from multiple files of the articles, and creating a unique name for the single printable file which identifies the sequence of the more than one articles contained in the single printable file, and the web-store server transmitting the new printable file to a print server via the network for printing the sequence of articles; and
      c2. the print server saving the new single printable file in the remote cache;
   d. if the matching single printable file exists, then:
      d1. either the web-store server or the print server retrieving the stored single printable file from the remote cache; and
      d2. the print server using the retrieved single printable file to print the print job without the web-store server creating any part of a new single printable file or transmitting any part of the new single printable file to the print server via the network.

2. The method according to claim 1, wherein step (c1) further comprises a step of the web-store server collecting one or more of the sequence of articles from a content source via the network.

3. The method according to claim 1, wherein the step (b) further comprises a step of using the name of the single printable file to determine whether it contains the sequence of articles matching the print job order.

4. The method according to claim 1, wherein step (d2) further comprises a step of copying the retrieved single printable file for the print server.

5. A system for managing print jobs comprising at least one data processing apparatus having a non-transitory memory storing a computer software program and a processor executing the computer software program, wherein the computer software program includes program code configured to cause the at least one data processing apparatus to execute a process which comprises the steps of:
   a. a web-store server receiving a print job order for printing a sequence of more than one articles;
   b. the web-store server checking a remote cache via a network to determine whether a single printable file is stored therein which contains the sequence of articles matching the print job order;
   c. if the matching single printable file does not exist, then:
      c1. the web-store server generating a new single printable file containing the sequence of articles from multiple files of the articles, and creating a unique name for the single printable file which identifies the sequence of the more than one articles contained in the single printable file, and the web-store server transmitting the new printable file to a print server via the network for printing the sequence of articles; and
      c2. either the web-store server or the print server saving the new single printable file in the remote cache;

d. if the matching single printable file exists, then:
   d1. either the web-store server or the print server retrieving the stored single printable file from the remote cache; and
   d2. the print server using the retrieved single printable file to print the print job without the web-store server creating any part of a new single printable file or transmitting any part of the new single printable file to the print server via the network.

6. The system according to claim 5, wherein step (c1) of the process further comprises a step of the web-store server collecting one or more of the sequence of articles from a content source via the network.

7. The system according to claim 5, wherein the step (b) of the process further comprises a step of using the name of the single printable file to determine whether it contains the sequence of articles matching the print job order.

8. The method according to claim 5, wherein step (d2) of the process further comprises a step of copying the retrieved single printable file for the print server.

9. A computer software program product having a computer readable program code embedded in a computer usable non-transitory storage medium for controlling at least one data processing apparatus including a web-store server and a print server, the computer readable program code configured to cause the at least one data processing apparatus to execute a process for managing print jobs, comprising the steps of:
   a. the web-store server receiving a print job order for printing a sequence of more than one articles;
   b. the web-store server checking a remote cache via a network to determine whether a single printable file is stored therein which contains the sequence of articles matching the print job order;
   c. if the matching single printable file does not exist, then:
      c1. the web-store server generating a new single printable file containing the sequence of articles from multiple files of the articles, and creating a unique name for the single printable file which identifies the sequence of the more than one articles contained in the single printable file, and the web-store server transmitting the new printable file to the print server via the network for printing the sequence of articles; and
      c2. either the web-store server or the print server saving the new single printable file in the remote cache;
   d. if the matching single printable file exists, then:
      d1. either the web-store server or the print server retrieving the stored single printable file from the remote cache; and
      d2. the print server using the retrieved single printable file to print the print job without the web-store server creating any part of a new single printable file or transmitting any part of the new single printable file to the print server via the network.

10. The computer software program product according to claim 9, wherein step (c1) of the process further comprises a step of the web-store server collecting one or more of the sequence of articles from a content source via the network.

11. The computer software program product according to claim 9, wherein the step (b) of the process further comprises a step of using the name of the single printable file to determine whether it contains the sequence of articles matching the print job order.

12. The computer software program product according to claim 5, wherein step (d2) of the process further comprises a step of copying the retrieved single printable file for the print server.

13. The method according to claim 1, wherein each article of the sequence of articles has an article ID, and wherein the unique name for the single printable file is generated based on the article IDs of all articles in the sequence of articles contained in the single printable file.

14. The method according to claim 13, wherein the unique name for the single printable file is generated by applying a hash function to the article IDs of all articles in the sequence of articles.

15. The system according to claim 5, wherein each article of the sequence of articles has an article ID, and wherein the unique name for the single printable file is generated based on the article IDs of all articles in the sequence of articles contained in the single printable file.

16. The system according to claim 15, wherein the unique name for the single printable file is generated by applying a hash function to the article IDs of all articles in the sequence of articles.

17. The computer software program product according to claim 9, wherein each article of the sequence of articles has an article ID, and wherein the unique name for the single printable file is generated based on the article IDs of all articles in the sequence of articles contained in the single printable file.

18. The computer software program product according to claim 17, wherein the unique name for the single printable file is generated by applying a hash function to the article IDs of all articles in the sequence of articles.

* * * * *